UNITED STATES PATENT OFFICE.

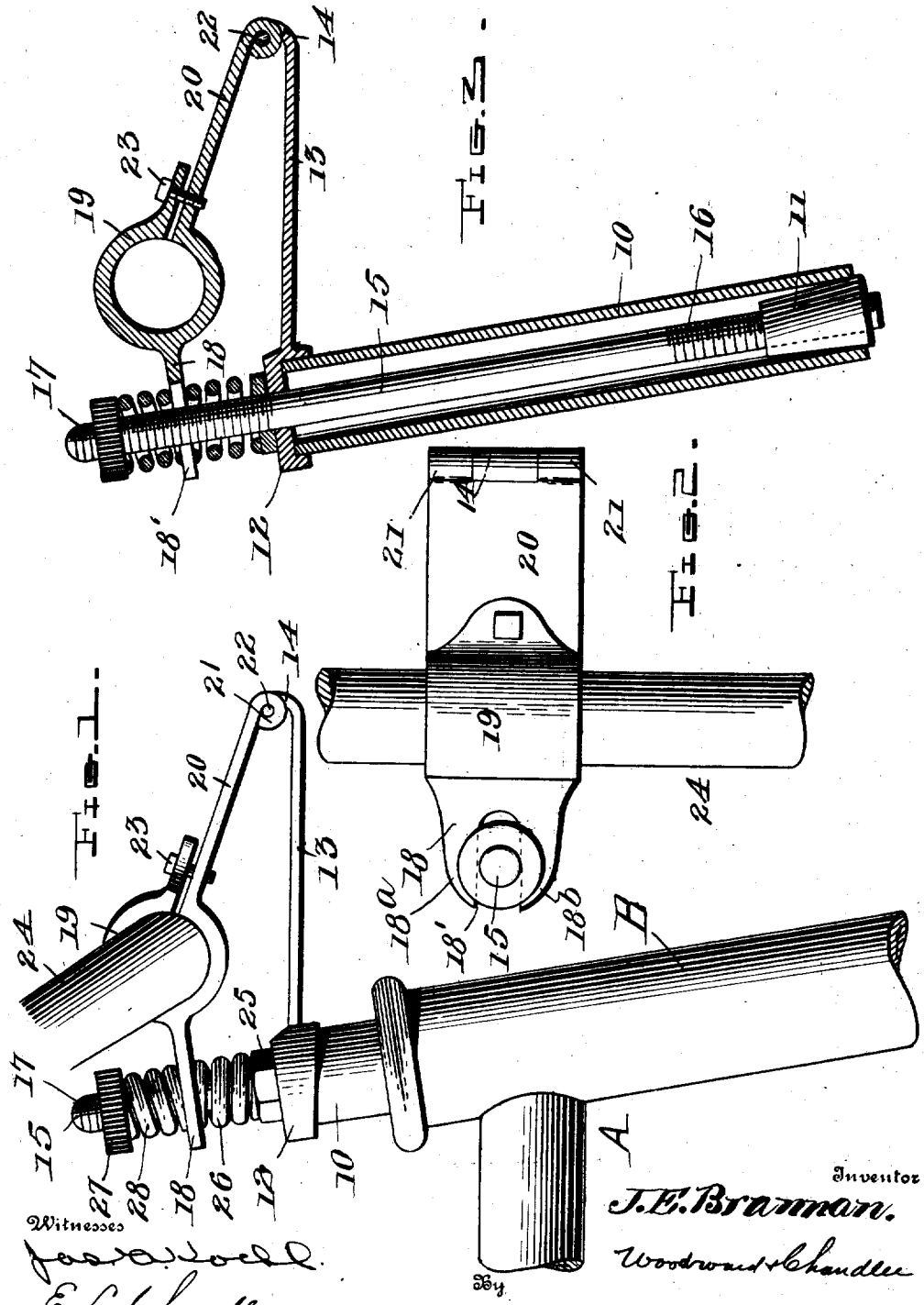

JAMES E. BRANNAN, OF IDAGROVE, IOWA.

BICYCLE HANDLE-BAR.

No. 897,579.  Specification of Letters Patent.  Patented Sept. 1, 1908.

Application filed December 20, 1907. Serial No. 407,390.

*To all whom it may concern:*

Be it known that I, JAMES E. BRANNAN, a citizen of the United States, residing at Idagrove, in the county of Ida and State of Iowa, have invented certain new and useful Improvements in Bicycle Handle-Bars, of which the following is a specification.

This invention relates to bicycle handle bars and is more particularly adapted for use upon motor driven bicycles, and has for its object to provide a handle bar whereby the usual vibration incident to the pounding of the motor or riding upon rough roads will be reduced to a minimum Other objects and advantages will be apparent from the following description and it will be understood that changes in the specific structure shown and described may be made within the scope of the claim without departing from the spirit of the invention In the drawings forming a portion of this specification and in which like numerals of reference indicate similar parts in the several views, Figure 1 is a side elevational view of a portion of a bicycle frame showing my present invention applied thereto, Fig. 2 is a top plan view, Fig. 3 is a vertical longitudinal sectional view through the stem.

Referring now more particularly to the drawings, there is shown a portion of a bicycle A including the usual head B. Arranged within the head, there is shown a hollow elongated tube 10, which is provided at its lower end with an interiorly threaded cone 11. The upper end of the tube is closed by a head 12, and this head is provided with an outwardly directed plate 13. The plate 13 at its outer end is curled as shown at 14 to provide one member of a hinged connection to be hereinafter referred to.

Disposed within the tube 10 there is shown a longitudinally extending bolt 15, and this bolt is threaded at its lower end as shown at 16 for engagement in the threaded passage formed in the cone 11. The bolt 15 is arranged with a portion extending outwardly of the head 12, and this portion of the bolt is also threaded as shown at 17.

Disposed upon the threaded portion 17 midway between the head 12 and the outer end of the bolt there is shown a plate 18, and this plate inwardly of the bolt 15 is provided with a split sleeve 19. The sleeve 19 is provided with an outwardly directed plate 20, and this plate has its inner ends curled as shown at 21, and these curled ends of the plate are thus arranged to lie at both sides of the portion 14. The portions 21 and 14 respectively are thus arranged to receive a pivot pin 22. The split sleeve 19 is provided with a set screw 23 which is arranged with a portion engaging the plate 20. The split sleeve 19 is thus arranged to receive a handle bar 24 of usual construction. The plate 18 previously described is preferably slotted as shown at 18' and is thus arranged with portions 18ª and 18ᵇ at opposite sides of the bolt 15.

Outwardly of the head 12 and arranged upon the threaded portion 17 the bolt 15 is provided with a nut 25 and arranged between this nut and the under side of the plate 18 there is shown a coil expansion spring 26. The outer end of the bolt 15 is provided with a milled nut 27, and disposed between the under side of this nut and the upper side of the plate 18 there is shown a spring 28 similar to the spring 26.

From the construction described it will be seen that a simple handle bar is provided which may be attached to bicycles of any construction, and it will be apparent that a practical means is provided for reducing vibrations on the arms while riding a motorcycle or bicycle. The thumb nut 27 is thus arranged to regulate the tension of the springs 26 and 28 respectively.

What is claimed is:

1. A bicycle handle bar comprising a hollow stem, a head carried by the stem at the upper end thereof, a plate carried by said head, a bolt located within said stem and having threaded portions adjacent its upper and lower ends, a cone engaged with the threaded lower end of said bolt, and arranged for frictional engagement within the stem, a plate hingedly connected with the first named plate, a handle-bar receiving sleeve carried by said last named plate, a forwardly extending plate carried by said sleeve and loosely engaged with said bolt outwardly of the head, springs carried by said bolt and disposed above and below said forwardly extending plate, and a nut engaged with the threaded upper end of said bolt.

2. A bicycle handle-bar comprising a hollow stem, a head carried by said stem at its upper end, a plate carried by said head, a cone located within the stem at its lower end, a bolt located within the stem, said bolt having a threaded lower end engaged with said cone, said bolt having a threaded upper end located outwardly of said head, a handle bar receiving sleeve hingedly connected with said plate and having a forked portion loosely engaged with said bolt, springs carried by said bolt and located above and below said forked portion, and nuts engaged with said bolt above and below said springs.

In testimony whereof I affix my signature, in presence of two witnesses.

JAMES E. BRANNAN.

Witnesses:
W. L. QUINLAN,
ROSS R. LATCHAW.